(12) United States Patent
Papavasiliou et al.

(10) Patent No.: US 7,692,838 B2
(45) Date of Patent: Apr. 6, 2010

(54) NANOLAMINATE DEFORMABLE MIRRORS

(75) Inventors: Alexandros P. Papavasiliou, Oakland, CA (US); Scot S. Olivier, Santa Cruz, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 12/362,758

(22) Filed: Jan. 30, 2009

(65) Prior Publication Data

US 2009/0159186 A1  Jun. 25, 2009

Related U.S. Application Data

(63) Continuation of application No. 11/501,590, filed on Aug. 8, 2006, now Pat. No. 7,518,780.

(60) Provisional application No. 60/706,657, filed on Aug. 8, 2005, provisional application No. 60/706,643, filed on Aug. 8, 2005.

(51) Int. Cl.
*G02B 26/08* (2006.01)
*G02B 7/182* (2006.01)
*H01L 21/00* (2006.01)

(52) U.S. Cl. .................. 359/221.2; 359/849; 438/107

(58) Field of Classification Search ............... 359/198.1, 359/221.2, 224.1, 290–292, 295, 298, 846, 359/849, 872; 438/107
See application file for complete search history.

(56) References Cited

U.S. PATENT DOCUMENTS 6,384,952 B1 * 5/2002 Clark et al. ............... 359/224.1
6,804,039 B1 10/2004 Doan et al.
2003/0036215 A1 2/2003 Reid
2004/0085657 A1 5/2004 Gullapalli et al.

OTHER PUBLICATIONS

Sarma N. Gullapalli et al, Performance of Flexure Hinged Substrate-Nanolaminate Deformable Mirror through Modeling and Simulation, UV/Optical/IR Space Telescopes: Innovative Technologies and Concepts, Proceedings of SPIE vol. 5166 (SPIE, Bellingham, WA, 2004). pp. 58-68.

Sarma N. Gullapalli et al, Hinged Substrate for Large Aperture Lightweight Deformable Mirrors—A Novel Concept. Highly Innovative Space Telescope Concepts, Proceedings of SPIE vol. 4849 (2002). pp. 305-320.

* cited by examiner

*Primary Examiner*—William C Choi
(74) *Attorney, Agent, or Firm*—John P. Wooldridge; John H. Lee

(57) ABSTRACT

A deformable mirror formed out of two layers of a nanolaminate foil attached to a stiff substrate is introduced. Deformation is provided by an electrostatic force between two of the layers. The internal stiffness of the structure allows for high-spatial-frequency shapes. The nanolaminate foil of the present invention allows for a high-quality mirror surface. The device achieves high precision in the vertical direction by using foils with accurately controlled thicknesses, but does not require high precision in the lateral dimensions, allowing such mirrors to be fabricated using crude lithography techniques. Such techniques allow structures up to about the meter scale to be fabricated.

26 Claims, 5 Drawing Sheets

NANOLAMINATE DEFORMABLE MIRRORS

This application is a continuation of U.S. patent application Ser. No. 11/501,590, filed Aug. 8, 2006 now U.S. Pat No. 7,518,780, titled: "Nanolaminate Deformable Mirrors", incorporated herein by reference, which claims the benefit of U.S. Provisional Application No. 60/706,657, filed Aug. 8, 2005, titled: "Deformable Nanolaminate Mirrors Actuated with MEMS Actuators," and U.S. Provisional Application No. 60/706,643, also filed Aug. 8, 2005, titled: "Large-Scale Nanolaminate Deformable Mirrors," both of which are incorporated herein by reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to adaptive optics and more particularly to micro-electromechanical systems (MEMS) and nanolaminates for implementing adaptive optics.

2. Description of Related Art

Deformable mirrors in the field of adaptive optics are directed to the improvement of optical signals using information about signal distortions introduced by, for example, the environment in which the optical signals propagate. Several varieties of deformable mirrors have been previously demonstrated. Early deformable mirrors utilized glass or metal plates deformed by piezo or electromagnetic actuators. Later the field of micromechanical systems (e.g., MEMS) was applied to the creation of deformable mirrors. MEMS technology allowed the pixel density to greatly increase with as many as a thousand individual moving mirrors in a single small device. The batch fabrication of such devices decreased the pixel cost by more than a factor of twenty from glass mirrors.

MEMS devices can achieve very accurate deformations because their electrostatic actuators are easy to characterize and are very repeatable. While such devices can create high spatial frequency shapes because the springs internal to the MEMS actuators limit the influence an actuated pixel can have on its not-actuated neighbor, these devices tend to have surface topography limitations and incorporate a limited range of optical materials. Moreover, although they can very accurately position mirrors, these devices have been limited in size and mirror quality. Meanwhile, microfabrication techniques have also been applied to higher quality mirrors by fabricating piezo actuators or electrostatic pads directly on the back of the mirror. These devices, however, are limited in the shapes they can create because each individual actuator affects all of its neighbors.

Accordingly, a need exists for a deformable mirror configuration having greater actuator density than has previously been available for continuous deformable mirrors, and a much higher quality mirror than has previously been available using high-density MEMS deformable mirror configurations. The present invention is directed to such a need.

SUMMARY OF THE INVENTION

The present invention is directed to a deformable mirror that includes a nanolaminate conformably coupled to an actuation structure so as to produce high spatial frequency displacements.

Another aspect of the present invention is directed to a deformable mirror that includes a nanolaminate configured with a degree of curvature and conformably coupled to an actuation structure so as to produce high spatial frequency displacements.

A final aspect of the present invention is directed to a method for producing a deformable mirror that includes producing a free-standing nanolaminate foil; providing an actuation structure; and bonding the free standing nanolaminate foil with the actuation structure.

Accordingly, the present system and method provides desired deformable mirror arrangement. The combination of electrostatic actuation and nanolaminate mirrors provide much greater actuator density than has previously been available for continuous deformable mirrors, and a much higher quality mirror than has previously been available with high-density MEMS deformable mirrors. Other benefits include:

Very Scalable>fits a large variety of applications

More robust for tough handling & bonding>higher reliability

Electrostatic actuators allow the high pixel-density and cost advantages of batch fabrication. But electrostatic actuators are weak. The material properties of nanolaminates (high strength and toughness) mean that a foil can be made that is thin enough to be flexible enough to be deformed by the weak electrostatic actuators and robust enough to be handled and bonded to the actuators.

High quality mirror surface>higher reflectance>higher productivity

Continuous mirror surface>necessary for high-power lasers

High actuator density>greater control of mirror surface shape

BRIEF DESCRIPTION OF THE DRAWINGS

The accompanying drawings, which are incorporated into and form a part of the disclosure, illustrate an embodiment of the invention and, together with the description, serve to explain the principles of the invention.

FIG. 2(d) shows an example voltage vs. displacement curve for parallel-plate linear spring (patterned spring layer) and built-in plate (continuous spring layer) actuators.

DETAILED DESCRIPTION OF THE INVENTION

Figure 1:
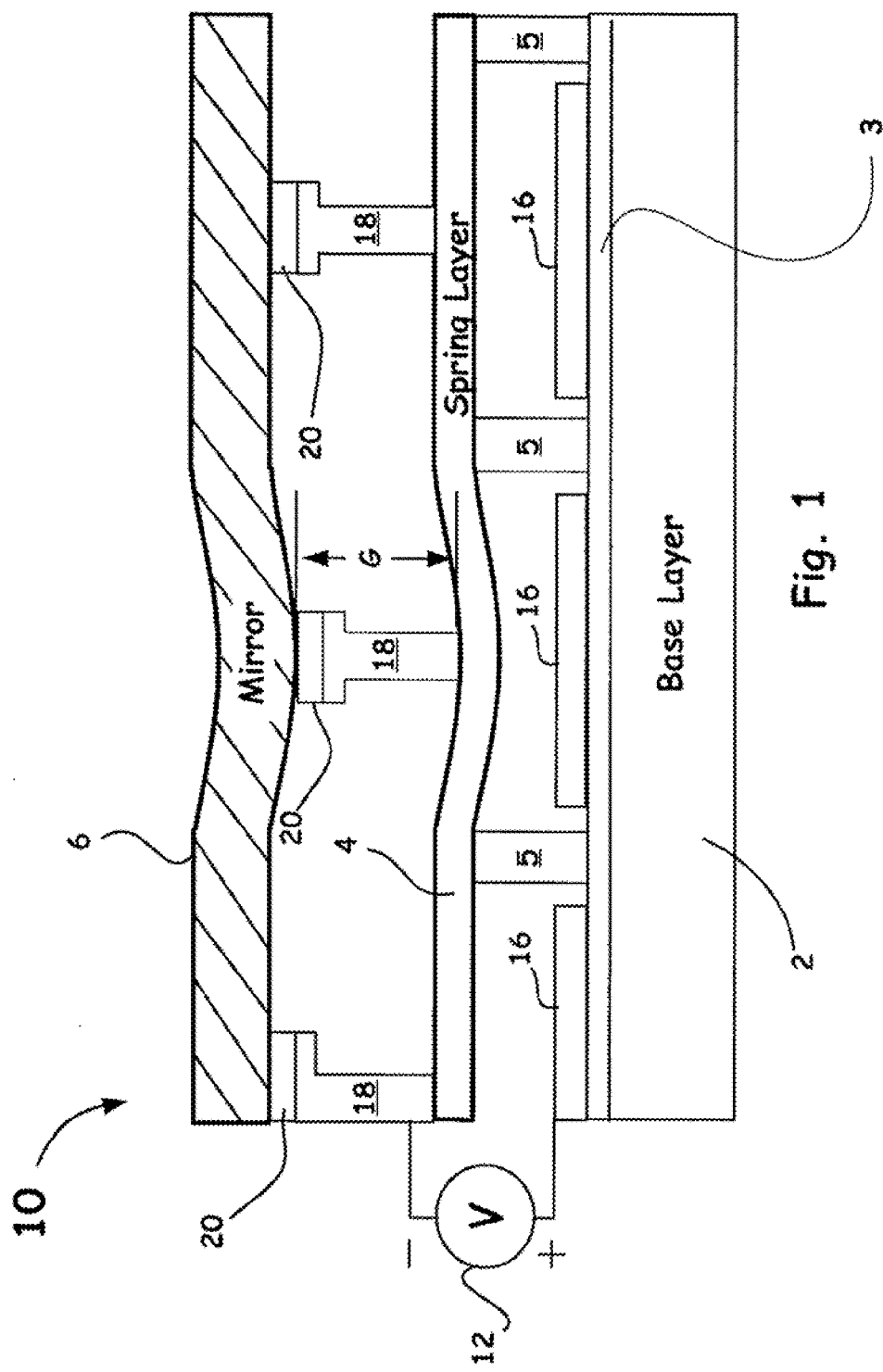
FIG. 1 shows the cross section of an example high-density mirror nanolaminate and/or a large-scale nanolaminate deformable mirror configuration of the present invention.

Referring now to the drawings, specific embodiments of the invention are shown. The detailed description of the specific embodiments, together with the general description of the invention, serves to explain the principles of the invention.

Unless otherwise indicated, all numbers expressing quantities of ingredients, constituents, reaction conditions and so forth used in the specification and claims are to be understood as being modified in all instances by the term "about". Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

General Description

The design structures of the present invention are highly scalable for different pixel sizes. The accuracy of the deflection of the mirror is proportional to the vertical dimensions (i.e., up to about 15 µm). The vertical dimensions are all controlled by thicknesses of applied materials (e.g., by deposition methods known by those of ordinary skill in the art). Using methods of the present invention, etched and electroplated structures and nanolaminates (e.g., nanolaminate foils) having well-controlled thicknesses on the order of the desired deflections enables the production of a mirror with a well-controlled deflection.

The sensitivity of such structures, as disclosed herein, with respect to line width errors is proportional to the pitch between pixels, i.e., down to about 1.0 mm (note: spatial frequency displacements are proportional to the pitch between pixels). The high density devices of up to about 1 million pixels/m$^2$ are produced with microlithography techniques known and used by those of ordinary skill in the art to enable line-width errors on the order of about a micron. The large-scale devices can tolerate line-width errors on the order of about 50 µm, allowing the parts to be defined by conventional printed-circuit-board lithography techniques that can be used on about the meter scale.

Parallel-plate Electrostatic Actuators:

Parallel-plate electrostatic actuators are used extensively in microsystems and MEMS applications as well as in the present invention. A parallel-plate electrostatic actuator is simply a plate of conducting material suspended above a stationary plate of conducting material, by a spring. When the plates are placed at different electrical potentials, such as, attaching the positive side of a battery to one plate and the negative side to the other, the plates are drawn together by electrostatic attraction. The attractive force is balanced by, the restoring force of the springs. The force in a parallel-plate electrostatic actuator is a function of the inverse gap squared: $F=\frac{1}{2}[(\epsilon_0 AV^2/(g-x)^2$ where $\epsilon_0$ is the electric permittivity in free space, A the surface area of an electrode plate, (g−x) the gap between the upper conductor and the lower electrode, and V is the bias voltage. Thus if the displacement of an electrostatic actuator is opposed by a linear spring force (F=−kx), with k being the spring constant and x being the displacement, the electrostatic force increases more rapidly than the restoring spring force. The electrostatic and spring forces can be balanced to find the dynamic displacement as a function of voltage. Simple electrostatic actuators do not suffer from hysteresis or temperature effects. Thus, once sufficiently characterized, a parallel plate actuator can be accurately and dynamically positioned by controlling the voltage applied to it.

Creating High-Spatial-Frequency Shapes:

One of the problems in creating deformable mirrors is controlling the degree to which the actuation of one pixel influences the deformation of its neighbors. The greater the influence, the harder it is to create high-spatial-frequency shapes. The determining factor in how much influence each pixel has on its neighbors is the relative stiffness of the actuator to the mirror surface. If the mirror is much stiffer than the actuator, the system acts something like a trampoline. A local deformation is translated through the stiff mirror to the other weak actuators. If the actuator is stiffer, the system acts much more like a mattress. A local deformation is not translated to the rest of the device because the weak mirror is held steady by stiff actuators. In order to form high-spatial-frequency shapes, the actuators of the present invention are designed to be stiff relative to the mirror. Since the entire system must be flexible to be deformed by weak electrostatic actuators, the mirror surface as disclosed herein is chosen to be flexible.

Nanolaminate Foils:

Nanolaminates of the present invention include a class of materials having alternating layers of two different materials, such as, but not limited to, Copper and Zirconium (Cu and Zr) that are capable of approaching theoretical limits of strength and capable of an optical finish of less than about 0.5 nm rms. While Copper and Zirconium are beneficial combinations, other materials in combination, such as, high purity copper, 304 stainless steel, zirconium, platinum and chromium can also be utilized with departing from the scope of the present invention. The strength property, in particular, is important because high specific strength produces a more durable foil at smaller cross sectional areas. Nanolaminates are synthesized using atom-by-atom physical vapor deposition magnetron sputtering. Elemental materials, alloys or compounds can be sputtered to produce individual layers having a precise thickness ranging from about a single monolayer (0.2 nm) up to about hundreds of monolayers (greater than about 1000 nm). Such materials adopt the surface figure of the mandrel on which they are deposited. As a result, when deposited on high quality substrates, they can be made sufficiently smooth for high quality optics. In addition, since many foils can be made from a single mandrel, their cost of production is much lower than for similarly sized optics which must be individually polished or machined.

The optical quality (less than about 0.5 nm) and very high strengths achievable in nanolaminate mirrors make them useful for integration with MEMS actuators fabricated by standard processes (e.g., having sacrificial layers preferentially etched in hydrofluoric acid). While MEMS actuators, which are scalable from about a centimeter to about a meter in diameter, can be used to produce very precise motion, they are incapable of producing large amounts of force and thus, the high strength of nanolaminate mirrors allows the configured mirrors of the present invention to be thin and flexible so as to be deformed by the weak MEMS actuators, but still strong enough to survive fabrication.

The vertical vias that separate layers in the MEMS electrostatic actuators, as disclosed herein, are often electroplated metal ridges and posts (e.g., electroplated nickel) or fabricated from photodefinable polymers. As another example arrangement, the same base material (e.g., silicon or a base laminate) can be etched using photolithography techniques utilized by those of ordinary skill in the art to produce such ridges having width and length dimensions of up to about 15 µm. Thereafter, the configured ridges can be electroplated to enable a structure having similar thermal expansion properties as the base material and thus a structure stable for the applied mirror arrangement.

The horizontal silicon layers of the present invention include nanolaminate layers. A nanolaminate actuator is attached to the metal ridges that suspend it above electrodes on a predetermined surface of the present invention. - - - A set of metal posts can be coupled (e.g., electroplated posts) on the back side of the mirror layer and is used to couple the mirror to the actuated layer. As a novel example embodiment, metal, such as, but not limited to gold, can be electroplated to the underside of the mirror, e.g., in the form of metal bumps. Thereafter, the mirror can be attached to the MEMS nanolaminate actuator via metal compression bonding.

Accordingly, the present invention is directed to deformable mirror configurations that can be utilized in optical applications, such as, but not limited to, adaptive optical correction of both large terrestrial telescopes and lightweight space optics, and high-power lasers. Such an invention combines high-spatial-density electrostatic actuators and thin, flexible, lightweight (e.g., nanolaminate) mirrors.

In particular, the present invention includes two similar yet novel deformable mirror arrangements that cover a wide range of size scales: (1) a high-actuator-density device (i.e., up to about 1 million pixels/m$^2$) that uses silicon MEMS actuators and (2) a large-scale (i.e., up to about a meter in clear aperture) low-density device that uses electrostatic actuators formed with a membrane, often constructed from a nanolaminate foil, arranged together with posts (e.g., electroplated posts) and ridges. Both devices utilize the same basic structure modified to fit the size requirements.

Specific Description

Turning now to the drawings, FIG. 1 shows a cross-section example design mirror configuration (e.g., a high-density mirror nanolaminate and/or a large-scale nanolaminate deformable mirror) of the present invention and is generally designated as reference numeral 10. These mirrors have linewidth errors of about 1 µm for the high density devices and up to about 50 µm for large scale device. P are designed to have up to about 1,000 pixels capable of low-spatial-frequency deformations of about 5-10 µm and high-spatial-frequency deformations of about 1-3 µm spaced by about 1 mm.

As shown in FIG. 1, the example mirror 10 devices of the present invention, include three horizontal layers (e.g., reference numerals 2, 4, and 6) separated by vertical standoffs (e.g., reference numerals 5 and 18). Specifically, a stiff base layer 2, having a thickness of up to about 500 µm and often configured from silicon (often silicon configured with an oxide layer 3) or glass or any stiff material, such as a thick nanolaminate foil, is arranged to provide mechanical support to the whole device. Silicon is a good choice of material for making a stiff, lightweight substrate because silicon has a young's modulus near that of Titanium but has a lower density. However, while silicon is a beneficial substrate material, other base substrate arrangements can include, for example, silicon carbide to enable a thinner, lighter substrate because silicon carbide has a density similar to silicon and is around four times as stiff as Titanium. Other beneficial arrangements for the base layer can include a ribbed structure or stretching the base layer across a ring like a drum head. Such embodiments can be utilized without departing from the spirit and scope of the present invention because such an arrangement results in an even greater substantial weight savings. Whatever base substrate arrangement that is chosen requires a) that the substrate be substantially smooth with an RMS roughness on the order of a micron or less, b) sufficiently stiff to hold the shape of the mirror, and c) that it have an insulating layer capable of resisting voltages on the order of up to about 100V.

Returning to FIG. 1, a continuous or patterned spring layer 4, fabricated from either a nanolaminate foil, or rolled steel and invar foils, and having a thickness from about 3 µm to about 10 µm, can be suspended above base layer 2 via bonding (e.g., via epoxy) to the top of a plurality of ridges 5, which are bonded (e.g., via epoxy) to base layer 2. A mirror 8, also fabricated from either a nanolaminate foil, or rolled steel and invar foils is coupled to posts 18. Such mirror foils 8 must be bonded to the MEMS actuators with sufficient strength to hold together and the bonding process must not destroy the MEMS actuators.

Thus, for example, while the underside of mirror 6 can be coupled to posts 18 using adhesive bonding (epoxy,) such coupling is more often via metal compression bonding (e.g., shown by reference 20) and the distal end of posts 18 are then coupled to spring layer 4 also via, for example, by epoxy or metal compression bonding. When a voltage 12 is applied between spring layer 4 and electrodes 16 (e.g., gold electrodes) on base layer 2, the spring layer deforms to close a gap (denoted by the letter G and accompanying arrows). This deformation is translated through posts 18 to the mirror 6 layer.

It is to be appreciated that the mirror configurations of the present invention can also be fabricated on curved surfaces. For example, nanolaminate foils can easily be fabricated in curved shapes, such as any conic shape to include, convex, concave, elliptical, hyperbolic, and parabolic configurations, etc., merely by depositing the nano-laminates on a designed curved substrate. Lithography can be achieved on curved surfaces with laser systems. Electroplating can easily be achieved on curved surfaces. Adhesive deposition may be more challenging. Screen printing only works on flat surfaces. However, it may be possible to use a stamping system where adhesive is applied to a curved, patterned stamp and applied to a curved substrate. Bonding to a slightly curved substrate is also fairly straightforward.

Two different types of spring layers can be utilized in the mirror configurations disclosed herein, patterned springs and a continuous spring layer. In the case of the patterned springs, beam shaped springs are cut into a fairly thick foil such that most of the spring layer moves in one rigid piece. In the other case, the spring layer is a thin, continuous piece of foil which deforms continuously.

The continuous design has the benefit of not requiring an additional patterning and aligning step. In addition, a continuous design is stable in a larger fraction of the initial gap than the patterned design. Such an increased stability comes as a result of the non-linearity of a deforming plate, and the fact that the portion of the plate near the edges does not move as far as the portion in the center, resulting in less overall force than the patterned actuator in which the actuator moves as a rigid plate. This disparity in overall force, however, ultimately means that the patterned design requires less voltage for the same performance.

Figure 2A:
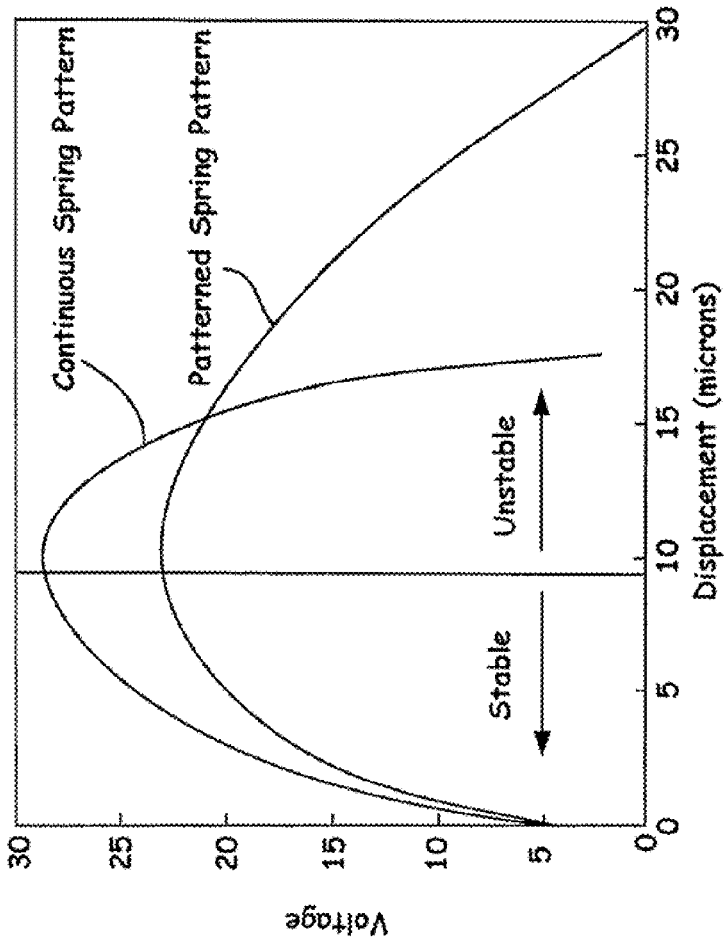
FIG. 2(a) shows a cross section example of a continuous spring layer.
Figure 2A:
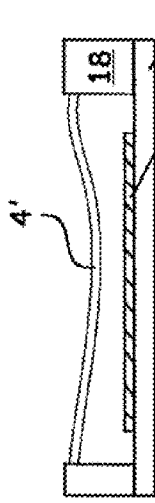
Figure 2B:
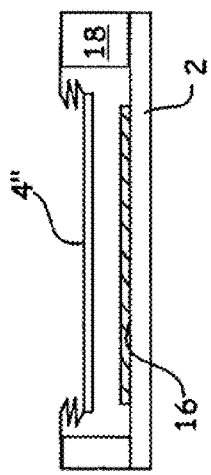
FIG. 2(b) shows a cross section example of a patterned spring layer.
Figure 2C:
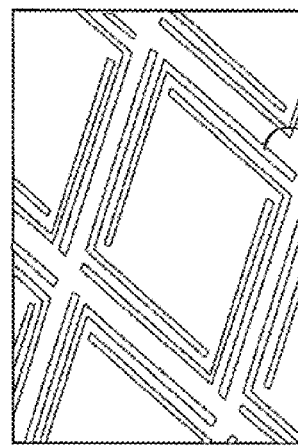
FIG. 2(c) illustrates a drawing of a patterned spring layer design 28.

FIG. 2(a) shows a cross section example of a continuous spring layer 4' in conjunction with base layer 2, electrode 16, and ridge 18, as shown in FIG. 1. FIG. 2(b) shows a cross section example of a patterned spring layer 4" in conjunction with base layer 2, electrode 16, and ridge 18, as shown in FIG. 1. FIG. 2(c) illustrates a drawing of a patterned spring layer design 28.

FIG. 2(d) shows an example voltage vs. displacement curve produced by the present invention for parallel-plate linear spring (patterned spring layer) and built-in plate (continuous spring layer) actuators. The actuators both have the same stroke (10 μm) and the same spring constant. The actuators are only stable below 10 μm displacement where an increase in voltage is required for an increase in displacement. The continuous spring layer only requires a 1.7 μm gap, but requires more voltage than the patterned spring layer, which requires a 30 μm gap.

A beneficial aspect of the present invention is the scalability of the utilized fabrication technologies over a wide range of size scales. Thus, the present invention uses a combination of scaleable techniques and scale-appropriate techniques, as discussed below, to accomplish MEMS-like functionality over a wide range of sizes.

Lithography

Small scale mirrors of the present invention can be patterned with conventional contact microlithography. Large scale devices, as disclosed herein, can also utilize conventional microlithography techniques when coupled with a design process geared to be compatible with printed circuit board lithography. Since the pitch of the actuators in these devices is proportionately larger, these devices are much more tolerant of lithography errors. Simulations show a deviation in drive voltage as a function of deviations from the nominal actuator area with a result that a lithography error of 50 μm, larger than those expected with dry-film resist lithography, produced a drive voltage deviation of about only 0.8%.

Electroplating

Similar to the lithography of silicon MEMS devices, the production of consistent silicon films and the patterning of those films are limited to the size of silicon wafers. In order to fabricate devices on a much larger scale, the methods of the present invention used electroplated metal to produce the vertical elements of the deformable mirror. The metal is electroplated up through a photoresist mask, then planarized to control the thickness of the posts and ridges. Very precise thickness control of down to about 1 μm can be achieved by a combination of localized addition and removal of material along with localized thickness measurements. Brush plating can be used to add material locally by concentrating the field and plating solution in a localized area where not enough material had been deposited earlier. Small-tool grinding can be used to remove material from areas where excess material has been deposited.

Metal Foils for Springs and Mirrors

The horizontal spring and mirror layers, as shown in FIG. 1, can be fabricated from, for example, rolled metal foils or nanolaminate foils. Both of these materials can be fabricated over a wide range of sizes. Rolled metal foils are commercially available in very large sizes. The nanolaminates of the present invention can be deposited on a variety of diameter substrates of up to about a meter with no fundamental limit on the size of a nanolaminate foil. The patterning of metal foils for patterned spring layers has been performed using printed circuit board lithography and by laser cutting. Both techniques are capable of producing very large patterned areas as discussed herein.

Areal Density

The present invention can produce a lightweight mirror made with an areal density on the order of 1 kg/m$^2$. Since the nanolaminate layers are thin enough to be flexible, they are also lightweight. A representative device with 15 μm thick mirror layer, 7 μm thick spring layer and a 200 μm thick base layer has an areal density of 2.32 kg/m$^2$.

Bonding

While metal compression bonding is a beneficial attachment method, epoxy, which requires no additional heating is also a beneficial method for attaching various parts of the deformable mirrors. Early devices showed significant print-through due to leakage of the epoxy away from the bonding location. Such leakage has been minimized by reducing the volume of epoxy and increasing the accuracy of the deposition. This has resulted in greatly reduced print-through. The utility of epoxy bonding has been extended to large-pixel-count devices by the use of a screen printer. The screen printer allows the production of thousands of individual dots of epoxy on the order of about 100 μm in width.

Counteracting the Effects of Curling by Edge Clamping:

One of the most vexing problems in the development of nanolaminate-based deformable mirrors has been the difficulty in producing flat foils. It is important that the residual moment in the foils be small enough that it can be overcome by the weak electrostatic actuators. It is believed that the primary cause of curling in nanolaminate foils is the heating of the foil during deposition. The top layers of the foil are deposited at a higher temperature than the bottom layers. When the foil temperature equilibrates, the different temperature changes through the thickness of the foil results in different thermal stresses. When the foil is released, the differences in stress result in curling. Accordingly, calibration with day-long deposition runs is required each time any of the deposition parameters are changed. Alternatively, the present invention teaches using edge clamping of a mirror to counteract the moment that causes curling in the foils. This enables the fabrication of functional nanolaminate deformable mirrors without requiring strictly flat foils. In the absence of any other loads, equal and opposite moments applied at either end of a beam produces a constant moment in the beam. If there is already a constant moment in the beam due to internal stresses, the moment applied at the ends can counteract that moment by superposition and bring the total moment in the beam to zero. In two dimensions a constant isotropic bending moment such as the thermally-induced stress believed to cause curling in nanolaminate foils, can be counteracted by clamping all the edges of the plate.

Figure 3B:
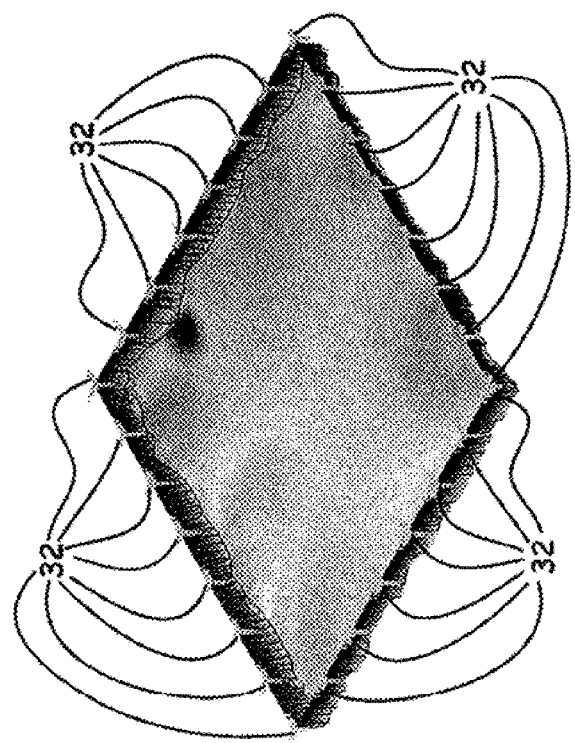
FIG. 3(b) shows finite element analysis (FEM) analysis of a plate having an intrinsic moment while clamped at all four edges.
Figure 3A:
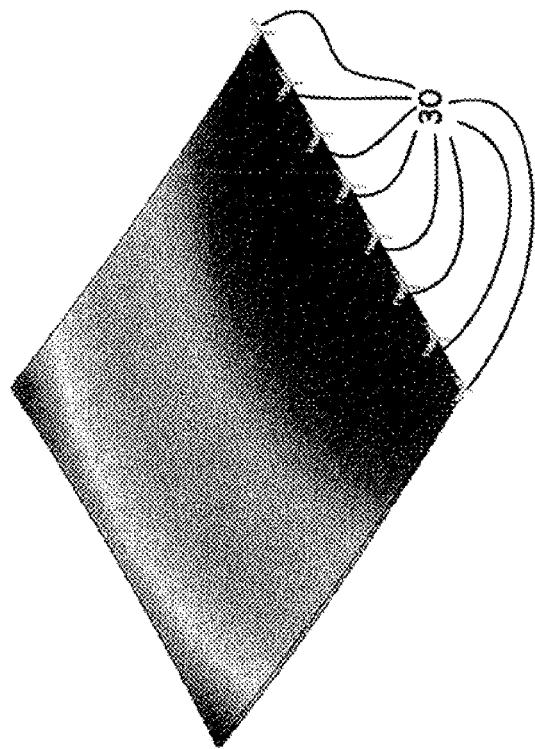
FIG. 3(a) shows finite element analysis (FEM) of a plate having an intrinsic moment while clamped at one edge.

FIG. 3(a) and FIG. 3(b) show finite element analysis (FEM) of a plate having an intrinsic moment while being clamped. In particular, FIG. 3(a) shows a plate clamped only at one edge (denoted by reference numerals 30). FIG. 3(b) shows a plate clamped (denoted by reference numerals 32) on all four edges. The deformations of the fully clamped version are over four orders of magnitude smaller and result primarily from a peculiarity in the way the analysis was done. The plate was simulated as two flat plates with equal but opposite coefficients of thermal expansion. The upper plate, with a negative CTE, shrunk and therefore moved downward relative to the perfectly stationary edges.

Model

In designing the deformable mirror configurations of the present invention, a parametric model is produced by first modeling the actuator, then the mirror, then combining the two. The model is then utilized to determine parameters for the design of the actuator that yields the desired performance.

Actuator Model

The first step in modeling a system is to model the actuator portion of the mirror. If all the actuators are actuated together, the mirror moves as a solid body and there is no stress applied on the actuator by the mirror. Therefore, the displacement of an actuator by itself is a good estimation of the low-spatial frequency displacement.

Patterned Spring Layer Design

The patterned spring layer is then modeled as a parallel-plate actuator having linear springs. The springs are modeled as fixed-guided beams. The spring and electrostatic forces can be balanced with the force applied by the mirror to solve for displacement as a function of voltage.

Continuous Spring Layer Design

The deformation of such an actuator is modeled by balancing the strain energy in the deformed plate with the change in electrostatic energy in the capacitor between the deformed plate and the stationary electrode. The deformed plate was assumed to have the shape of a double cosine curve, the exact solution for small deformations with a uniform load. Although the deformation of the actual plate is likely to be different due to the concentration of electrostatic load near the center, this deviation will be small.

Mirror Model

The deformation of a plate having arbitrary loads is the solution to a partial differential equation. Such a model for the mirror is only valuable if it yields parametric information about the displacement of pixels relative to each other under loads. A simplified system was utilized based on a repeating high-spatial-frequency pattern to enable an easily found solution, which provided a meaningful metric for relative displacement between pixels.

Checkerboard Pattern

A mirror can be modeled with a "checker board" actuation pattern wherein every other actuator is pulled down with the maximum potential and the alternate actuators are not actuated. The checkerboard is a repeating high-spatial-frequency shape that can be easily modeled. Each element in a checkerboard-loaded plate is a square plate with a point load in the center and simply supported at each edge. The displacement between the loaded and unloaded pixels gives information about the ability of the system to make high-spatial frequency shapes.

Integrated System

With models for the two major components of the deformable mirror, the next step was to combine the two to find the high-spatial-frequency response of the entire system. One of the benefits of the checkerboard pattern is that there are an equal number of actuated and un-actuated pixels. Thus, the force applied by each actuated pixel on the mirror must equal the force applied by the mirror on each un-actuated pixel.

Figure 4:
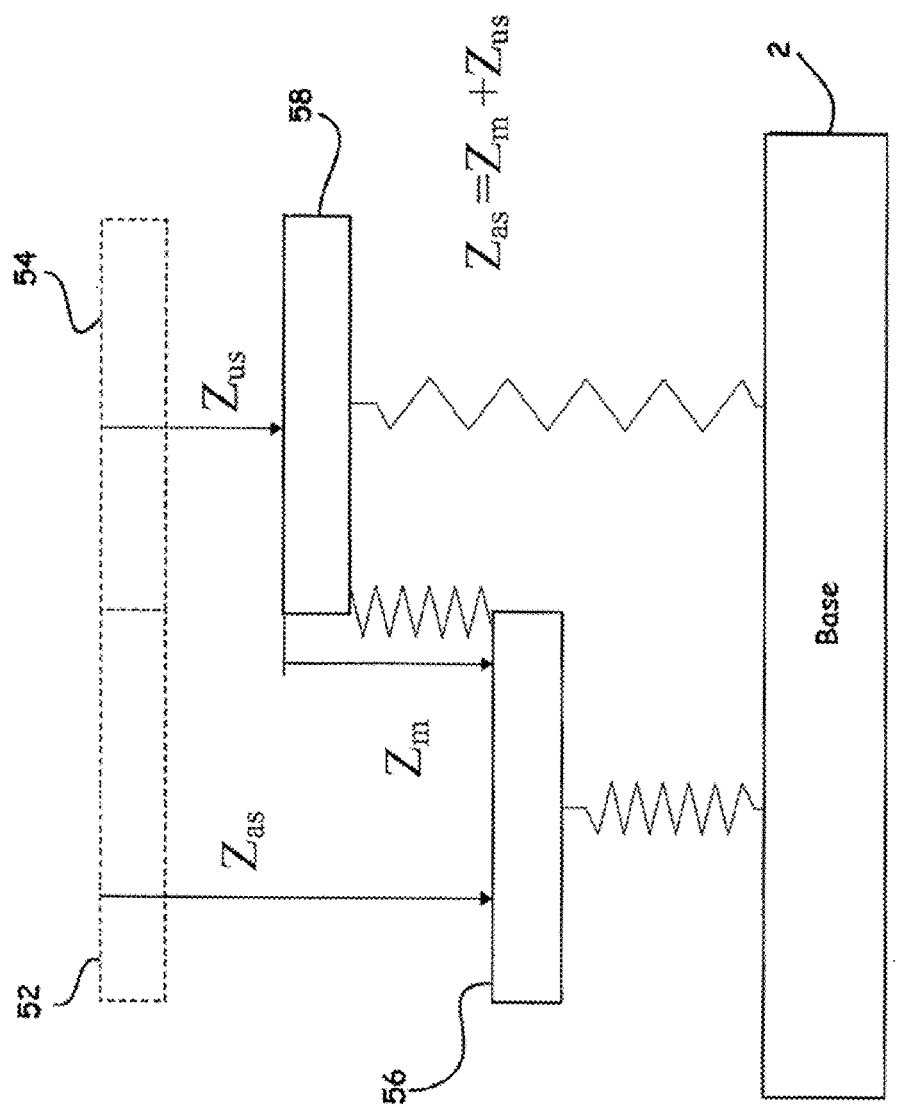
FIG. 4 shows a schematic of the actuated/un-actuated pixel system.

FIG. 4 shows a schematic of the actuated/un-actuated pixel system. The dotted boxes 52 and 54 indicate the rest position of both pixels, the grey boxes 56 and 58 indicate the deformed position of the pixels. Pixel 52 is pulled down electrostatically to position 56, pixel 54 on the right is pulled down to position 58 by the mirror. The mirror is represented by a spring between the two pixels. The other springs represent the forces with respect to the base substrate 2.

As shown in FIG. 4, the deflection of the actuated pixel, $Z_{as}$, 54 is equal to the sum of the deflection of the mirror $Z_m$, and the un-actuated pixel $Z_{us}$. A free-body diagram of the two pixels (not shown) reveals that the force translated through the mirror is equal to the restoring force of the deformed mirror and the restoring force of the un-actuated pixel. From the actuator model, an electrostatic force as a function of displacement is found. This gives us three equations and three unknowns, so the displacement of all three portions of the system can be solved and the high-spatial-frequency displacement can be found (note; high-spatial-frequency shapes are proportional to the pitch between pixels of the device, e.g., down to about 1 mm).

Intermediate spatial frequencies were estimated by scaling the results for high-spatial-frequency. The stiffness and actuation force of the actuators were multiplied by the number of pixels ganged together. Since plate stiffness is proportional to inverse length squared, the mirror stiffness is divided by the spacing between the centers of groups of actuators ganged together squared.

Figure 5B:
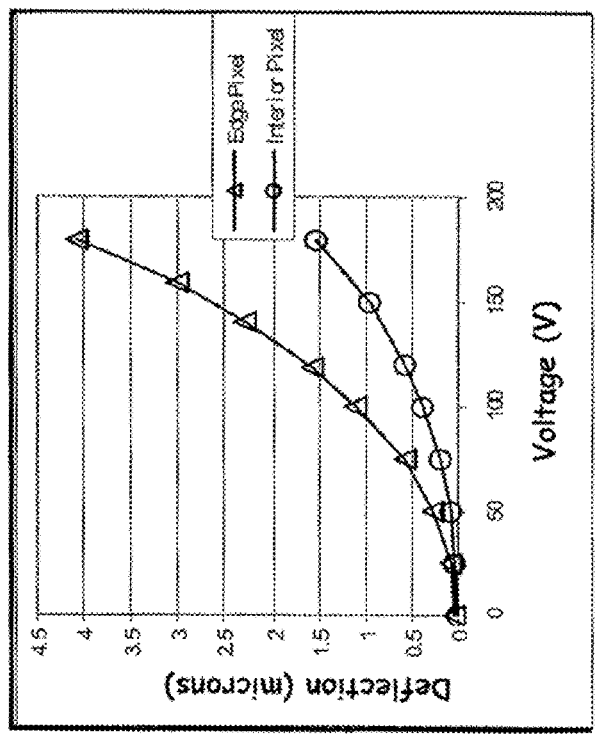
FIG. 5(b) shows a deflection versus voltage plot for the spring layer of a constructed example 76-pixel large-scale deformable mirror.
Figure 5A:
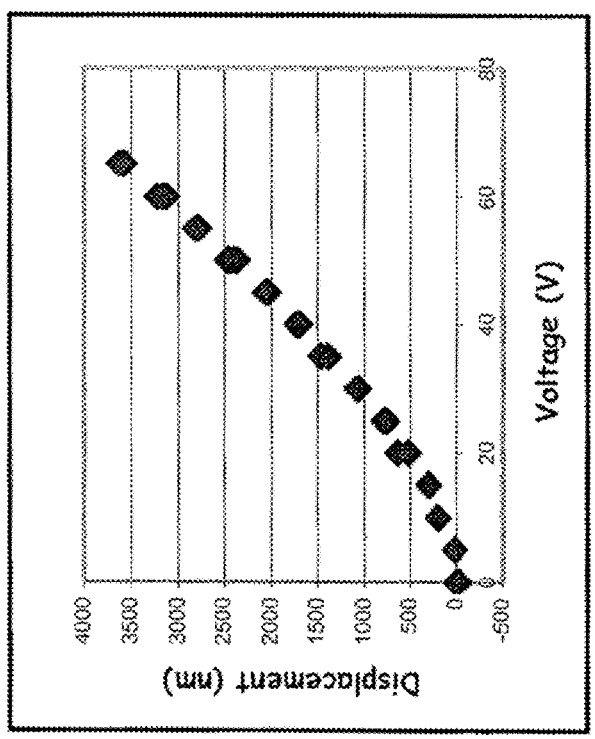
FIG. 5(a) shows a deflection versus voltage plot for the spring layer of an example 32×32 high-density mirror.

FIG. 5(a) and FIG. 5(b) shows example deflection versus voltage data of constructed mirror configurations produced as a result of the above model method. Specifically, FIG. 5(a) shows a deflection versus voltage plot for the spring layer of a constructed example 32×32 high-density mirror. FIG. 5(b) shows a deflection versus voltage plot for the spring layer of a constructed example 76-pixel large-scale deformable mirror.

It should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method for fabricating a deformable mirror, comprising:
   providing a substrate;
   coupling a resilient layer to said substrate;
   electrically coupling a plurality of electrodes to said resilient layer, wherein each of said electrodes and said resilient layer are adapted to have a respective applied potential so as to dynamically change the shape of said resilient layer;
   configuring a nanolaminate with an optical finish of less than about 0.5 nm; and
   conformably coupling said nanolaminate to said resilient layer.

2. The method of claim 1, wherein said nanolaminate comprises alternating layers of different materials.

3. The method of claim 1, wherein said resilient layer further comprises a layer selected from a continuous spring layer or a patterned spring layer.

4. The method of claim 1, wherein a plurality of vias are adapted to separate said substrate from said resilient layer.

5. The method of claim 4, wherein said vias comprise electroplated metal ridges and posts or fabricated photodefinable polymers.

6. The method of claim 1, wherein a plurality of vias are adapted to separate said resilient layer from said nanolaminate.

7. The method of claim 6, wherein said vias comprise electroplated metal ridges and posts or fabricated photodefinable polymers.

8. The method of claim 1, wherein said mirror comprises a clear aperture of up to about one meter.

9. The method of claim 1, wherein said mirror has a configured resultant pixel density of up to about 1 million pixels/$m^2$.

10. The method of claim 1, wherein said nanolaminate comprises a thickness of down to about 5 microns.

11. The method of claim 1, wherein said resilient layer comprise a nanolaminate.

12. The method of claim 1, wherein said substrate comprises a structure selected from: a ribbed structure or stretched base layer.

13. The method of claim 1, wherein said substrate comprises a material selected from: a nanolaminate foil, glass, silicon, or silicon carbide.

14. A method for fabricating a deformable mirror, comprising:

providing a substrate;

coupling a resilient layer to said substrate;

electrically coupling a plurality of electrodes to said resilient layer, wherein each of said electrodes and said resilient layer are adapted to have a respective applied potential so as to dynamically change the shape of said resilient layer; and configuring a nanolaminate with a degree of curvature; and conformably coupling said nanolaminate to said resilient layer so as to produce high spatial frequency displacements.

15. The method of claim 14, wherein said degree of curvature includes conic shapes selected from convex, concave, elliptical, hyperbolic, and parabolic configurations.

16. The method of claim 14, wherein said nanolaminate comprises alternating layers of different materials.

17. The method of claim 14, wherein said resilient layer further comprises a layer selected from a continuous spring layer or a patterned spring layer.

18. The method of claim 14, wherein a plurality of vias are adapted to separate said substrate from said resilient layer.

19. The method of claim 18, wherein said vias comprise electroplated metal ridges and posts or fabricated photodefinable polymers.

20. The method of claim 14, wherein a plurality of vias are adapted to separate said resilient layer from said nanolaminate.

21. The method of claim 20, wherein said vias comprise electroplated metal ridges and posts or fabricated photodefinable polymers.

22. The method of claim 14, wherein said mirror comprises a clear aperture of up to about one meter.

23. The method of claim 14, wherein said mirror has a configured resultant pixel density of up to about 1 million pixels/m$^2$.

24. The method of claim 14, wherein said nanolaminate comprises a thickness of down to about 5 microns.

25. The method of claim 14, wherein said resilient layer comprise a nanolaminate.

26. The method of claim 14, wherein said substrate comprises a material selected from: a nanolaminate foil, glass, silicon, or silicon carbide.

* * * * *